Patented July 11, 1933

1,917,399

UNITED STATES PATENT OFFICE

CYRIL J. STAUD, OF ROCHESTER, NEW YORK, AND CHARLES E. WARING, OF DAYTON, OHIO, ASSIGNORS TO EASTMAN KODAK COMPANY, OF ROCHESTER, NEW YORK, A CORPORATION OF NEW YORK

PREPARATION OF HOMOGENEOUS MIXTURES OF CELLULOSE NITRATE AND ACETATE

No Drawing. Application filed December 31, 1930. Serial No. 505,961.

This invention relates to the process of forming a homogeneous mixture of cellulose nitrate and cellulose acetate.

An object of the invention is the production of a cellulose derivative mixture which is not much more inflammable and is as capable of safe storage as cellulose acetate itself and yet is less expensive to produce and of more favorable physical properties. It is necessary to treat cellulose acetate in various ways to modify its properties such as flexibility, etc., to adapt it to the particular use for which it is intended. The product of our process is satisfactory for working up into the various commercial articles for which the cellulose derivatives are commonly used, without any treatment to modify its physical properties.

Another object of our invention is to make possible the direct mixing of these compounds without the precipitation and recovering of each separately from its reaction mixture. Heretofore to form a homogeneous mixture of cellulose derivatives the dry, finished compounds were mixed together in a common solvent; this has not proven satisfactory for many reasons. In the present invention it has been found unnecessary to remove the cellulose acetate from the reaction mixture in which it was produced and, in fact, the homogeneous solutions may be obtained by dissolving the nitrate in the acetate solution during its production and the acetate in homogeneous admixture with the nitrate may be precipitated. It has also been found that if the cellulose nitrate be first dissolved in acetic acid, solution of the nitrate in the acetate dope is more satisfactorily obtained. The addition of such an acetic acid solution of cellulose nitrate to the cellulose acetate dope results in a clear mixture.

Another object of the invention is the elimination of the fire hazard associated with the processes ordinarily used for uniting these materials in which highly inflammable solvents must be employed. The volatile organic solvents ordinarily used in combining these materials are highly inflammable and this, together with the presence of cellulose nitrate in solid form while dissolving the same makes this old procedure doubly dangerous. Difficult recovery problems are also involved in this old method which are eliminated in the present invention. It is also known that the preparation of mechanical mixture of the acetate and the nitrate of cellulose is likewise hazardous, in fact, any method where a considerable quantity of dry nitro-cellulose is present at one time is dangerous. By our present invention this danger of large quantities of dry nitro-cellulose being present is eliminated by the separate solution of the cellulose nitrate as pointed out in the preceding paragraph.

It has been previously known to introduce softening material into cellulose acetate by the use of nitro-cellulose as a carrier, the materials being homogeneously mixed by the use of acetic acid as a solvent, however, the use of the cellulose acetate dope as a solvent for the nitrate or the separate dissolving of the cellulose derivatives was not within the contemplation of that process.

We have found that cellulose nitrate of a nitgrogen content of approximately 10–14% can be added to cellulose acetate of approximately 36–42% acetyl, while the latter is still in the acetic acid solution in which it has been prepared. The cellulose nitrate is preferably first dissolved in acetic acid and this solution is added to the cellulose acetate dope, resulting in a clear mixture although the cellulose nitrate may be dissolved directly in the acetic acid solution of cellulose acetate. This mixture or dope may then be precipitated in any known manner by pouring into water or other non-solvents for such mixtures. The precipitate formed has good characteristics from the standpoint of washing and drying. Such mixtures may be dried at any temperature, preferably between 50–110° C. The precipitation bath is nothing more than a solution containing comparatively pure acetic acid and there is no contamination since the time of contact with the cellulose nitrate of the acetic acid is relatively short and the temperatures are low. The acid can then be recovered from the solution in any well known manner.

The following is an illustration of a specific example of the carrying out of the process according to our invention: About 50 grams of cellulose in the form of cotton linters is treated for about 3-6 hours with approximately 350 grams of acetic acid containing a little acetylation catalyst, preferably a 3:1 mixture of phosphoric and sulfuric acids. This mixture is kept at approximately 100° F. for the desired time and about 150 c.c. of acetic anhydride is then added, after lowering the temperature to approximately 60° F.

The mixture is then heated gradually to about 100° F. over a period of about 4 hours and maintained at that temperature until a satisfactory dope is obtained. The excess anhydride is then removed by the addition of about 30 c.c. of 75% acetic acid and the cellulose triacetate which is in solution in the mixture is hydrolyzed by adding a mixture of sulfuric acid, water and glacial acetic acid (preferably 1:30:60) and maintaining at about 100° F. for 30-60 hours. At the close of this period there is added approximately 7½ grams of cellulose nitrate containing approximately 12% nitrogen dissolved in about 40 c.c. of glacial acetic acid. This is agitated about an hour at approximately 70° F. and it is then precipitated by pouring into water and results in a very homogeneous mixture of cellulose acetate and nitrate.

It is understood that any cellulose acetate (or dope thereof) of approximately 36-42% acetyl content may be used in our process, the novelty of which resides in our method of mixing the two cellulose derivatives under consideration. The method may also be applied to the mixing of other cellulose derivatives such as the formates, butyrate, acetostearate, and the like, with cellulose nitrate and various technical details such as acids used, proportions, may be varied to suit the individual conditions. It is not necessary that the cellulose acetate be freshly prepared as dry cellulose acetate can be used by dissolving in acetic acid thus forming a dope to which the dry cellulose nitrate or its acetic acid solution may be added to form a homogeneous mixture.

What we claim and desire to secure by Letters Patent of the United States is:

1. The process of forming a homogeneous mixture of cellulose acetate and cellulose nitrate which comprises the dissolution of each in acetic acid, uniting the solutions, and precipitating the dissolved material.

2. The process of forming a homogeneous mixture of cellulose nitrate of approximately 12% nitrogen content and cellulose acetate of approximately 36-42% acetyl content which comprises adding an acetic acid solution of the nitrate to an acetic acid solution of the acetate and then pouring into a non-solvent to precipitate the dissolved material.

3. The process of forming a homogeneous mixture of cellulose nitrate of approximately 12% nitrogen and cellulose acetate of approximately 36-42% acetyl content which comprises adding an acetic acid solution of a nitrate to an acetic acid solution of the acetate and then pouring into water.

4. The process of forming a homogeneous mixture of cellulose acetate and cellulose nitrate which comprises dissolving both cellulose derivatives in acetic acid to form a homogeneous mixture and precipitating the dissolved materials from this common solution.

5. The process of preparing a homogeneous mixture of cellulose acetate and cellulose nitrate which comprises dissolving cellulose nitrate in a reaction mixture resulting from the acetylation of cellulose which contains cellulose acetate in solution in acetic acid and then precipitating out the homogeneous mixture of cellulose acetate and cellulose nitrate by means of a liquid which is a non-solvent for both of these cellulose derivatives.

6. The process of preparing a homogeneous mixture of cellulose acetate and cellulose nitrate which comprises adding an acetic acid solution of cellulose nitrate to the reaction mixture resulting from the acetylation of cellulose which contains cellulose acetate in solution in acetic acid and then precipitating out the dissolved material.

Signed at Rochester, New York, this 23rd day of December 1930.

CYRIL J. STAUD.

Signed at Dayton, Ohio, this 26th day of December 1930.

CHARLES E. WARING.